(12) United States Patent
Lin

(10) Patent No.: US 7,677,085 B1
(45) Date of Patent: Mar. 16, 2010

(54) GAS LEAK DETECTION APPARATUS

(75) Inventor: Yung-Chun Lin, Changhua Hsien (TW)

(73) Assignee: Jin Bor Shyh Industrial Co., Ltd., Changhua Hsien (TW)

( * ) Notice: Subject to any disclaimer, the term of this patent is extended or adjusted under 35 U.S.C. 154(b) by 629 days.

(21) Appl. No.: 11/541,865

(22) Filed: Oct. 2, 2006

(51) Int. Cl.
*G01M 3/04* (2006.01)

(52) U.S. Cl. .......................................... 73/40
(58) Field of Classification Search ............ 73/40; 137/81.1
See application file for complete search history.

(56) References Cited

U.S. PATENT DOCUMENTS 3,999,932 A * 12/1976 Matthews .................... 431/16
4,999,032 A * 3/1991 Wright ......................... 95/286
5,137,054 A * 8/1992 Harper .................. 137/614.19
5,535,777 A * 7/1996 Maracchi ..................... 137/458

* cited by examiner

*Primary Examiner*—Hezron Williams
*Assistant Examiner*—Mark Shabman
(74) *Attorney, Agent, or Firm*—Alan Kamrath; Kamrath & Associates PA

(57) ABSTRACT

A gas leak detection apparatus includes a main body, a magnetically operated valve, a magnetically exciting device, a pressure sensing device, and a pressure detector. Thus, if the pressure detector detects that the gas leak happens to the pipe located at the rear side of the gas regulator, the control circuit board drives the magnetically exciting device to produce a magnetic force to drive the magnetically operated valve to close the conduit of the valve chamber and the outlet of the main body so as to interrupt the gas flow, thereby preventing the gas from entering the pipe located at the rear side of the gas regulator so as to provide a safety effect to the user.

13 Claims, 7 Drawing Sheets

GAS LEAK DETECTION APPARATUS

BACKGROUND OF THE INVENTION

1. Field of the Invention

The present invention relates to a detection apparatus and, more particularly, to a gas leak detection apparatus for a gas regulator.

2. Description of the Related Art

A conventional gas regulator is mounted on an outlet terminal or a dividing terminal of a pipe or an equipment to control the gas flow rate of the gas passing through the pipe or the equipment. However, gas leak easily happens to the pipe or the equipment located at the rear side of the gas regulator, thereby greatly causing danger to the user.

BRIEF SUMMARY OF THE INVENTION

The primary objective of the present invention is to provide a gas leak detection apparatus, wherein if the pressure detector detects that the level of the control point of the pressure sensing device is changed during a preset period of time, which indicates that the gas leak happens to the pipe located at the rear side of the gas regulator, the pressure detector transmits the gas pressure signal from the pressure sensing device to the control circuit board which drives the magnetically exciting device to produce a magnetic force to drive the magnetically operated valve to close the conduit of the valve chamber and the outlet of the main body so as to interrupt the gas flow, thereby preventing the gas from entering the pipe located at the rear side of the gas regulator so as to provide a safety effect to the user.

Another objective of the present invention is to provide a gas leak detection apparatus, wherein when the gas leak detection apparatus detects an abnormal condition, such as falling of the gas line, instability of the gas pressure, the magnetically exciting device is operated to drive the magnetically operated valve to close the conduit of the valve chamber and the outlet of the main body so as to interrupt the gas flow.

A further objective of the present invention is to provide a gas leak detection apparatus, wherein the control circuit board indicates the inner conditions of the main body synchronously by an audio device, an optical device or a video device.

A further objective of the present invention is to provide a gas leak detection apparatus, wherein the gas leak detection apparatus is available for a gas regulator that is in use and not in use, thereby enhancing the versatility of the gas leak detection apparatus, and thereby facilitating the user operating the gas leak detection apparatus.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
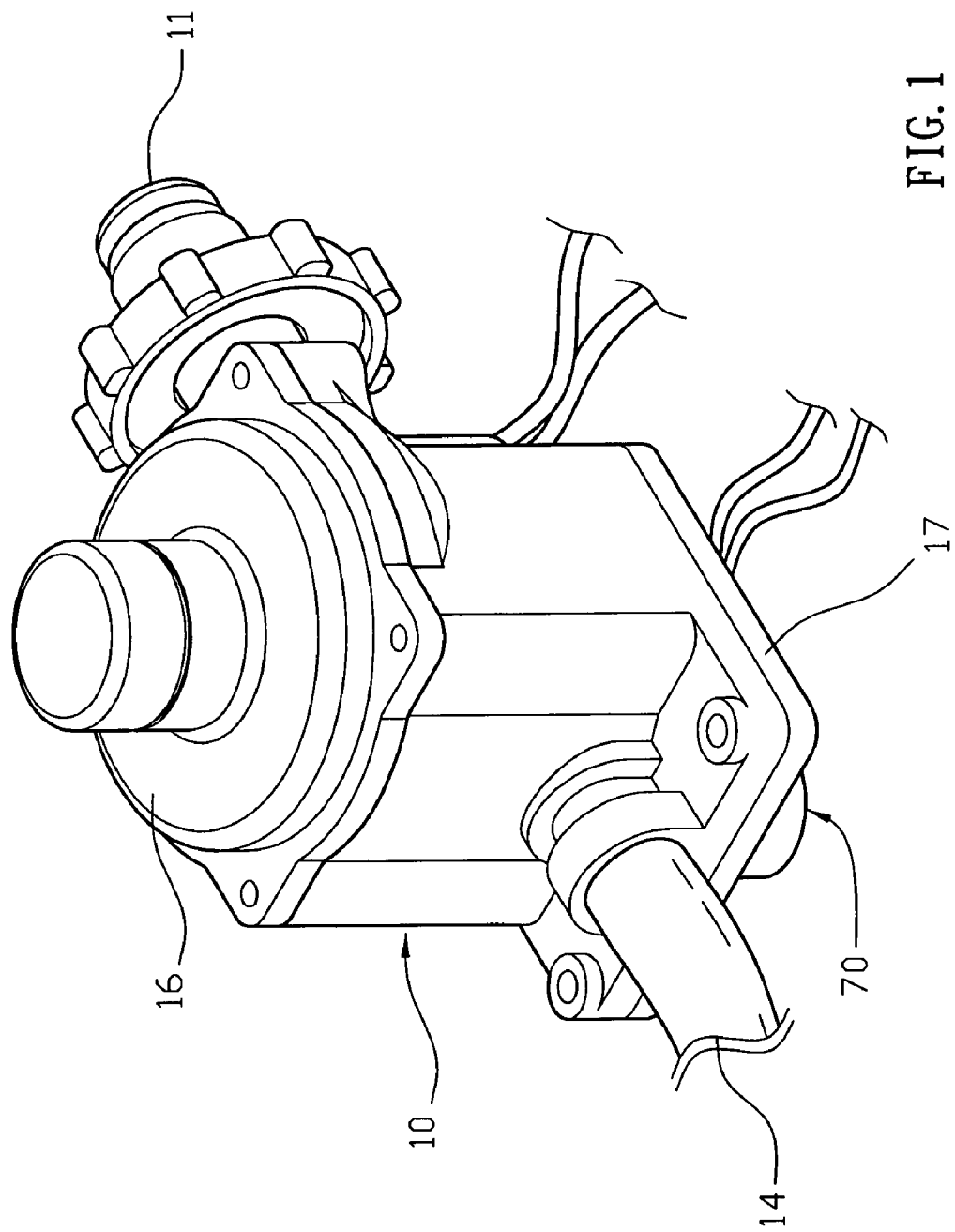
FIG. 1 is a perspective view of a gas leak detection apparatus in accordance with the preferred embodiment of the present invention.
Figure 2:
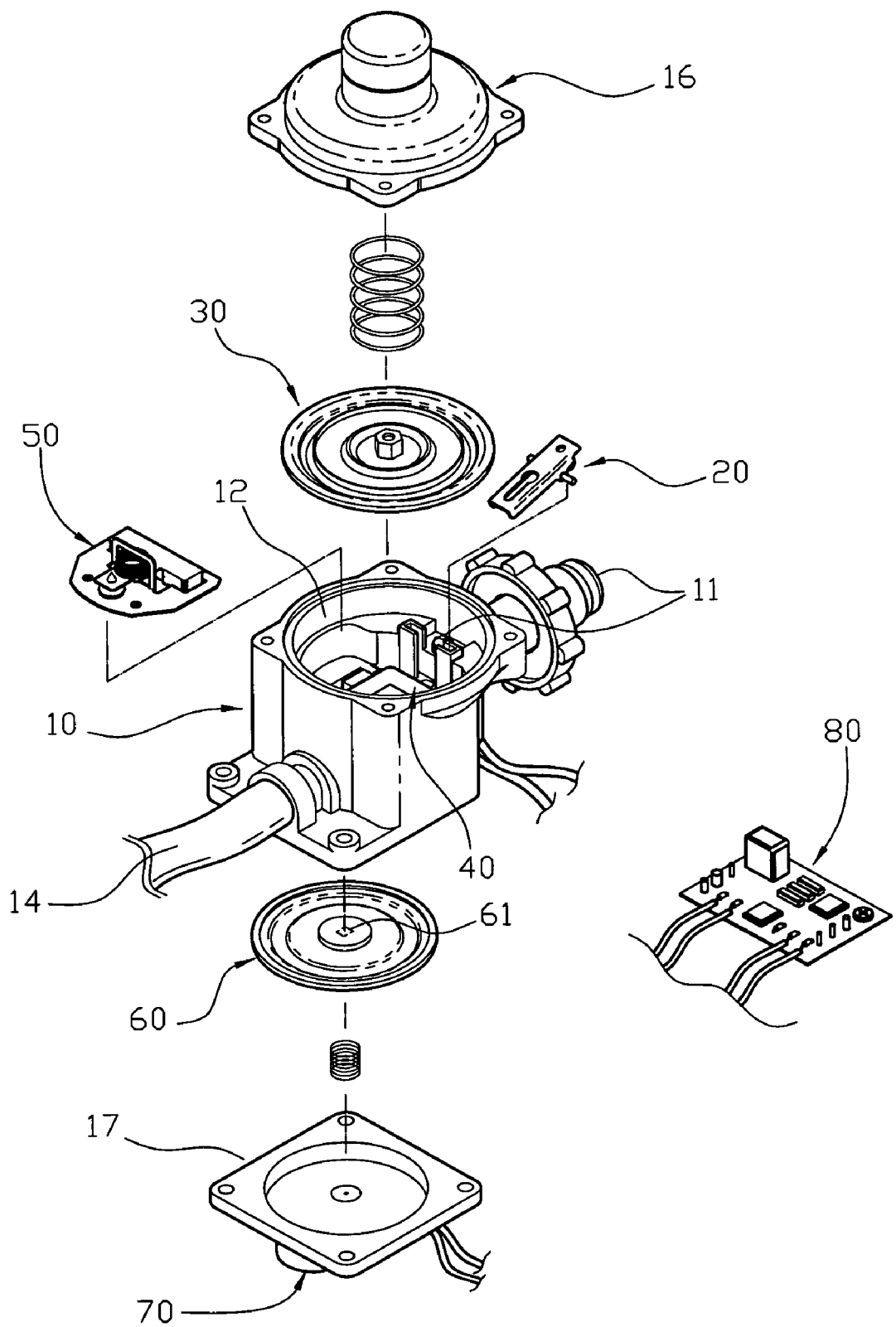
FIG. 2 is an exploded perspective view of the gas leak detection apparatus as shown in FIG. 1.
Figure 3:
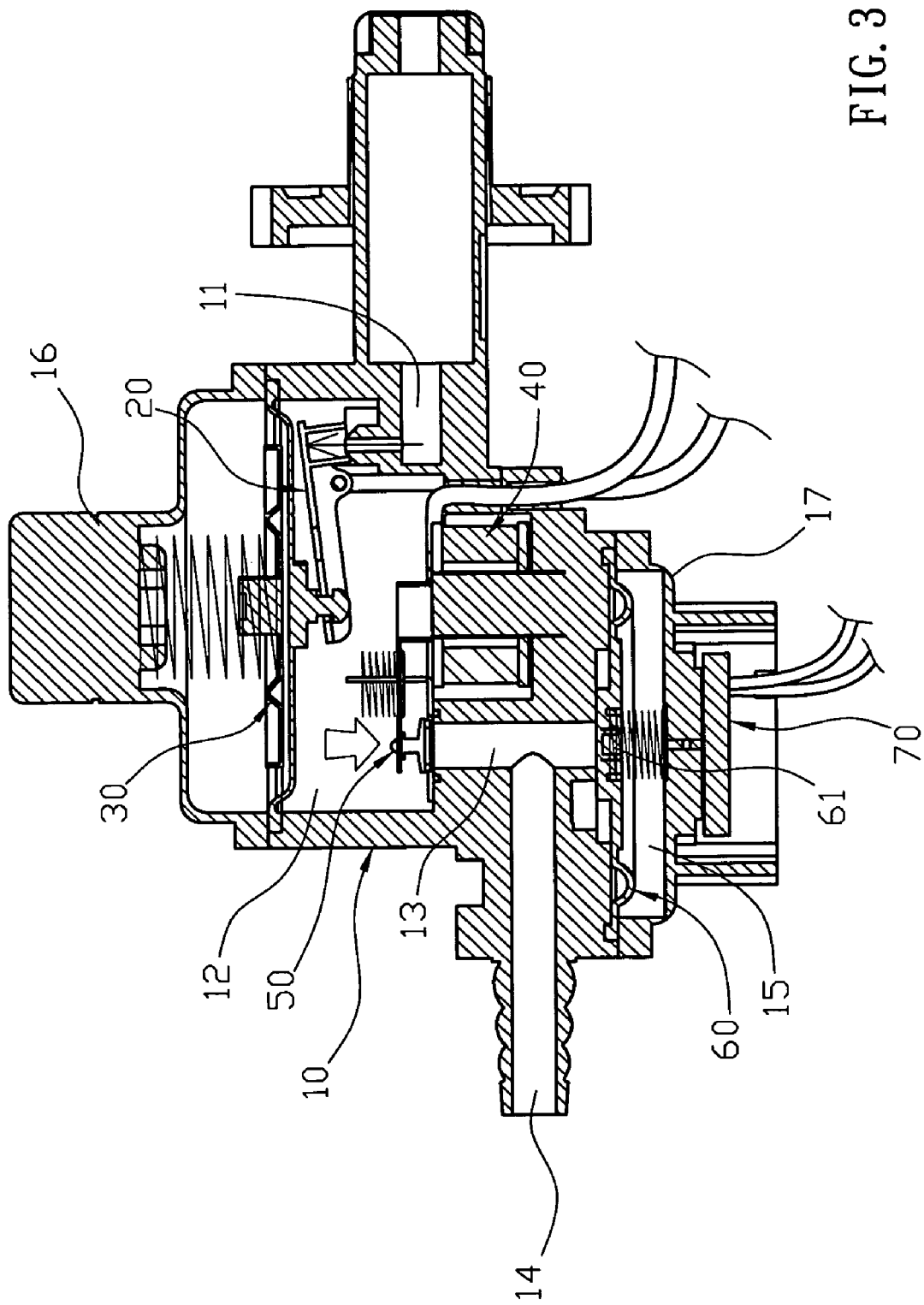
FIG. 3 is a plan cross-sectional view of the gas leak detection apparatus as shown in FIG. 1.

Referring to the drawings and initially to FIGS. 1-3, a gas leak detection apparatus in accordance with the preferred embodiment of the present invention comprises a main body 10 having a first side provided with an inlet 11 and a second side provided with an outlet 14 and having an inside formed with a detection chamber 15 (see FIG. 3) and a valve chamber 12 which has a first side connected to the inlet 11 and a second side provided with a conduit 13 connected to the outlet 14 and the detection chamber 15, a magnetically operated valve 50 mounted in the valve chamber 12 of the main body 10 to close or open the conduit 13 of the valve chamber 12, a magnetically exciting device 40 mounted in the valve chamber 12 of the main body 10 to control operation of the magnetically operated valve 50, a pressure sensing device 60 mounted in the detection chamber 15 of the main body 10 to sense a gas pressure contained in the conduit 13 of the valve chamber 12 to obtain a gas pressure signal, a pressure detector 70 mounted in the detection chamber 15 of the main body 10 to receive the gas pressure signal from the pressure sensing device 60 to control operation of the magnetically exciting device 40, a control lever 20 pivotally mounted in the valve chamber 12 of the main body 10 to adjust a size of the inlet 11 of the main body 10, and a pressure regulating device 30 movably mounted in the valve chamber 12 of the main body 10 to control movement of the control lever 20.

The valve chamber 12 of the main body 10 has an open wall for mounting a seal cover 16. The detection chamber 15 of the main body 10 has an open wall for mounting a seal cap 17.

The pressure regulating device 30 is movable upward and downward in the valve chamber 12 of the main body 10 by the gas pressure from the inlet 11 of the main body 10 into the valve chamber 12 of the main body 10 to move the control lever 20 upward and downward to adjust the size of the inlet 11 of the main body 10 and to control the gas flow rate from the inlet 11 of the main body 10 into the valve chamber 12 of the main body 10 so as to keep the gas pressure in the valve chamber 12 of the main body 10.

The magnetically exciting device 40 is located beside the conduit 13 of the valve chamber 12. The magnetically exciting device 40 is connected to and controlled by a control circuit board 80 to produce a magnetic force to drive the magnetically operated valve 50 to close or open the conduit 13 of the valve chamber 12 so as to close or open the outlet 14 of the main body 10.

The magnetically operated valve 50 is located above the magnetically exciting device 40 and the conduit 13 of the valve chamber 12. The magnetically operated valve 50 aligns with the conduit 13 of the valve chamber 12 and is operated to close the conduit 13 of the valve chamber 12 at a normal state so as to close the outlet 14 of the main body 10 at a normal state. In addition, the magnetically operated valve 50 is operated by the magnetically exciting device 40 to close or open the conduit 13 of the valve chamber 12 and the outlet 14 of the main body 10.

The pressure sensing device 60 is movable upward and downward in the detection chamber 15 of the main body 10 by the gas pressure contained in the conduit 13 of the valve chamber 12. The pressure sensing device 60 has a bottom provided with a control point 61 that is movable with the pressure \sensing device 60, so that the control point 61 has a level that is changed by movement of the pressure sensing device 60.

The pressure detector 70 is mounted on an outside of the seal cap 17 to detect the level of the control point 61 of the pressure sensing device 60 so as to detect the gas pressure contained in the conduit 13 of the valve chamber 12. The pressure detector 70 is connected to the control circuit board 80 to transmit the gas pressure signal from the pressure sensing device 60 to the control circuit board 80 which drives the magnetically exciting device 40 to produce a magnetic force to drive the magnetically operated valve 50 to close the conduit 13 of the valve chamber 12.

In practice, the gas leak detection apparatus is available for a gas regulator. The gas regulator is mounted on an outlet terminal or a dividing terminal of a pipe or an equipment to control the gas flow rate of the gas passing through the pipe or the equipment. Thus, the gas leak detection apparatus is mounted on the pipe or the equipment and located at a rear side of the gas regulator to detect if the gas leak happens to the pipe or the equipment located at the rear side of the gas regulator.

As shown in FIG. 3, when the gas regulator is not in use, the pressure regulating device 30 and the pressure sensing device 60 are not operated, the inlet 11 of the main body 10 is fully opened by control of the control lever 20, and the magnetically operated valve 50 is operated to close the conduit 13 of the valve chamber 12 and the outlet 14 of the main body 10 at a normal state.

Figure 4:
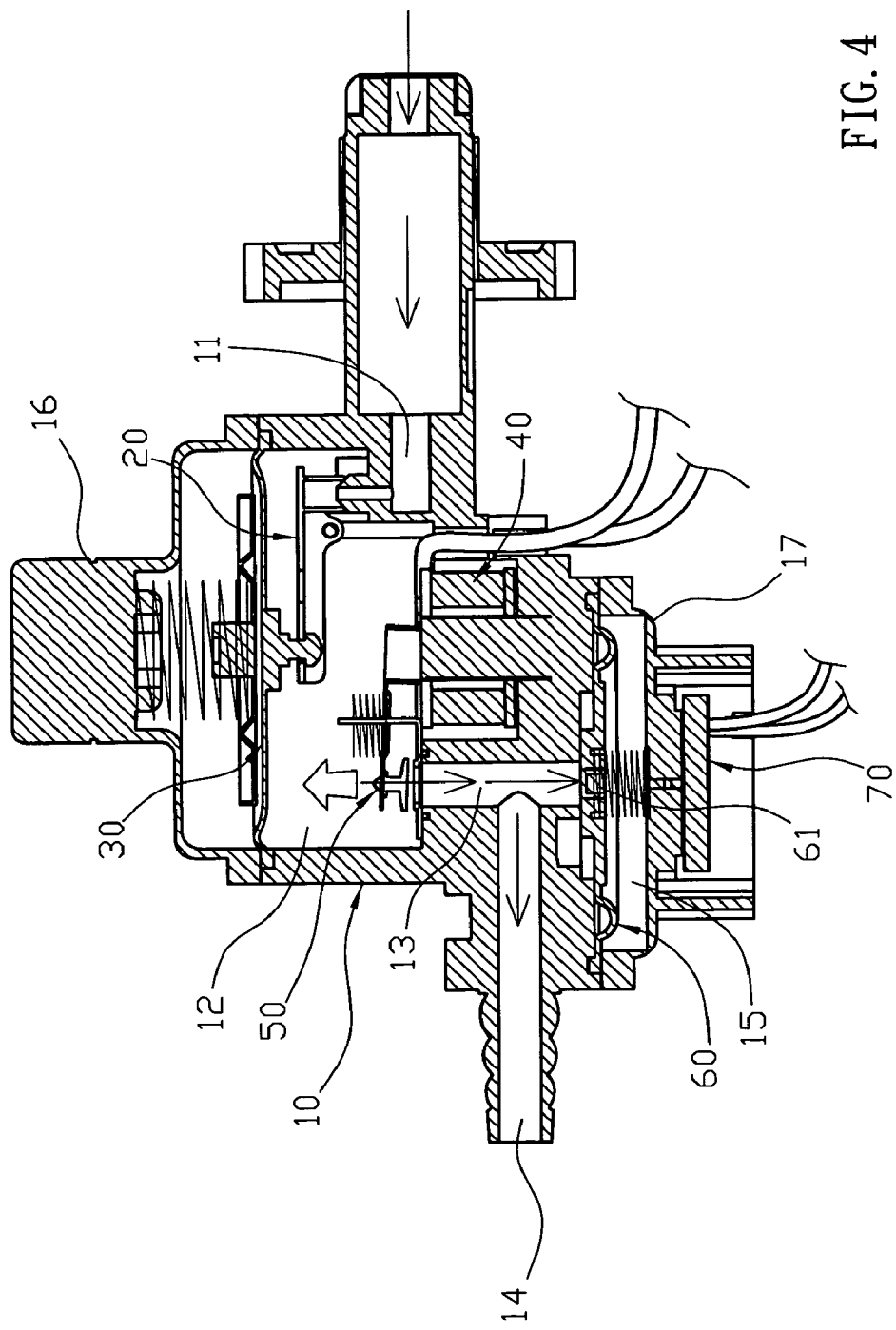
FIG. 4 is a schematic operational view of the gas leak detection apparatus as shown in FIG. 3.

As shown in FIG. 4, when the gas regulator is in use, the gas from the gas regulator flows through the inlet 11 of the main body 10 into the valve chamber 12 of the main body 10. At this time, the pressure regulating device 30 is movable upward and downward in the valve chamber 12 of the main body 10 by the gas pressure from the inlet 11 of the main body 10 into the valve chamber 12 of the main body 10 to move the control lever 20 upward and downward to adjust the size of the inlet 11 of the main body 10 and to control the gas flow rate from the inlet 11 of the main body 10 into the valve chamber 12 of the main body 10 so as to keep the gas pressure in the valve chamber 12 of the main body 10.

In addition, the magnetically exciting device 40 is controlled by the control circuit board 80 to produce a magnetic force to drive the magnetically operated valve 50 to open the conduit 13 of the valve chamber 12 and the outlet 14 of the main body 10, so that the gas from the valve chamber 12 of the main body 10 flows through the conduit 13 of the valve chamber 12 into the outlet 14 of the main body 10 and the detection chamber 15 of the main body 10 simultaneously. At this time, the pressure sensing device 60 is movable in the detection chamber 15 of the main body 10 by the gas pressure contained in the conduit 13 of the valve chamber 12, and the pressure detector 70 is operated to detect the level of the control point 61 of the pressure sensing device 60 to detect the gas pressure contained in the conduit 13 of the valve chamber 12.

Figure 5:
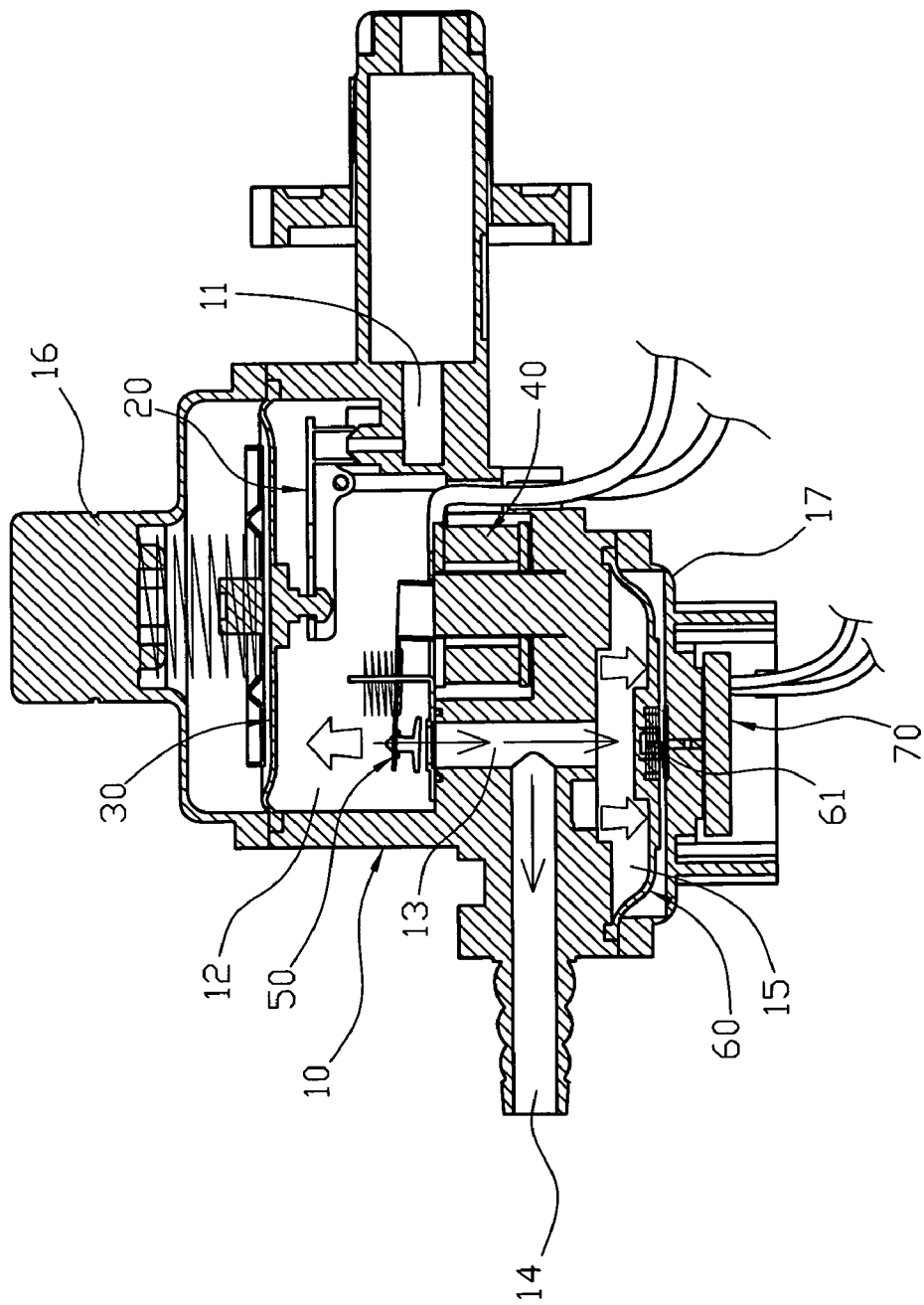
FIG. 5 is a schematic operational view of the gas leak detection apparatus as shown in FIG. 4.

As shown in FIG. 5, the outlet 14 of the main body 10 is closed, the magnetically operated valve 50 is driven to open the conduit 13 of the valve chamber 12, the pressure sensing device 60 is movable by the gas pressure contained in the conduit 13 of the valve chamber 12, and the pressure detector 70 is operated to detect the level of the control point 61 of the pressure sensing device 60 to detect the gas pressure contained in the conduit 13 of the valve chamber 12. If the pressure detector 70 detects that the level of the control point 61 of the pressure sensing device 60 is not changed during a preset period of time, the gas leak does not happen to the pipe located at the rear side of the gas regulator.

Figure 6:
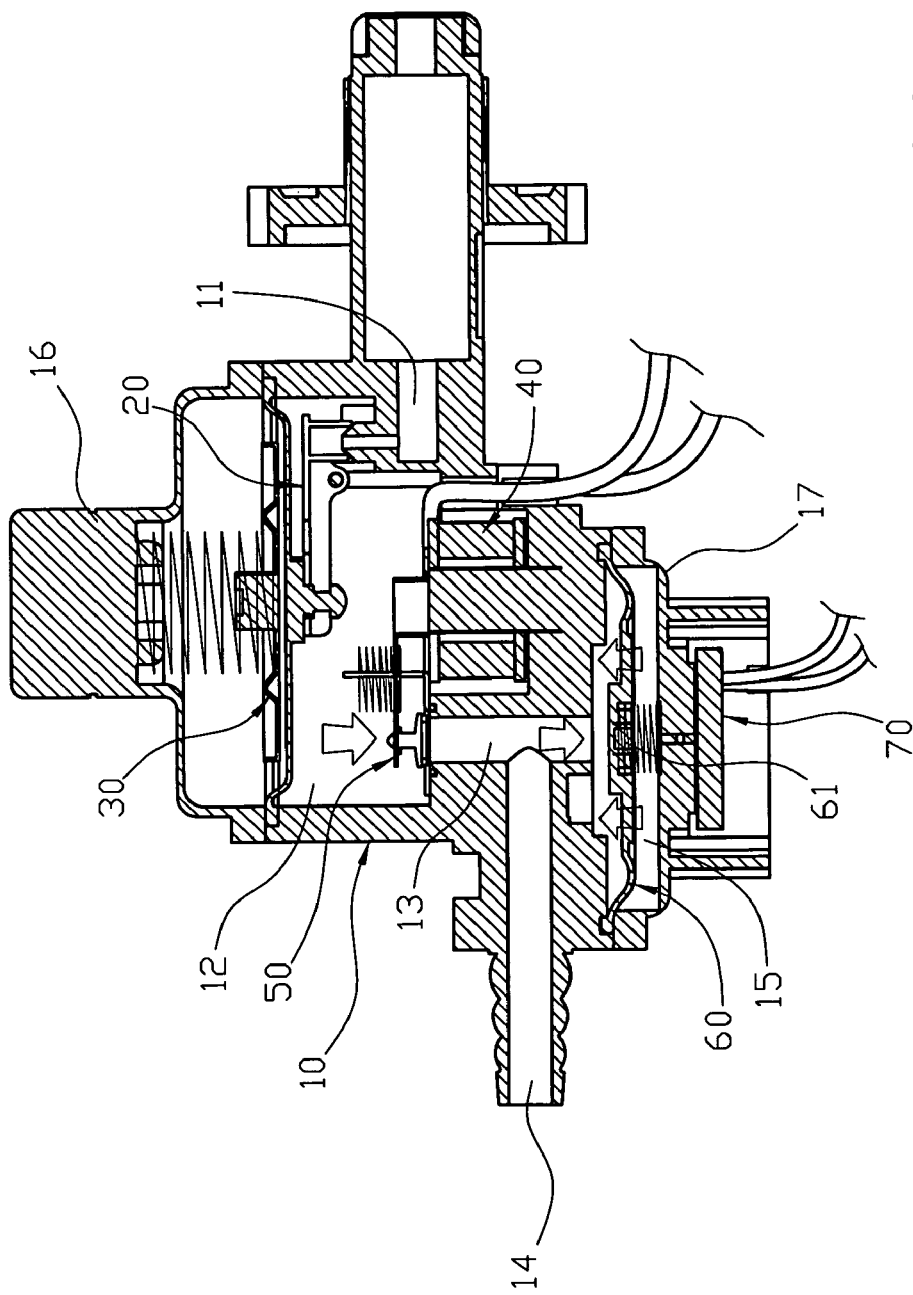
FIG. 6 is a schematic operational view of the gas leak detection apparatus as shown in FIG. 5.

As shown in FIG. 6, if the pressure detector 70 detects that the level of the control point 61 of the pressure sensing device 60 is changed during a preset period of time, which indicates that the gas leak happens to the pipe located at the rear side of the gas regulator, the pressure detector 70 transmits the gas pressure signal from the pressure sensing device 60 to the control circuit board 80 which drives the magnetically exciting device 40 to produce a magnetic force to drive the magnetically operated valve 50 to close the conduit 13 of the valve chamber 12 and the outlet 14 of the main body 10 so as to interrupt the gas flow, thereby preventing the gas from entering the pipe located at the rear side of the gas regulator so as to provide a safety effect to the user.

Thus, the gas leak detection apparatus is available for a gas regulator that is in use and not in use, thereby enhancing the versatility of the gas leak detection apparatus, and thereby facilitating the user operating the gas leak detection apparatus. In addition, when the gas leak detection apparatus detects an abnormal condition, such as falling of the gas line, instability of the gas pressure, the magnetically exciting device 40 is operated to drive the magnetically operated valve 50 to close the conduit 13 of the valve chamber 12 and the outlet 14 of the main body 10 so as to interrupt the gas flow. Further, the control circuit board 80 indicates the inner conditions of the main body 10 synchronously by an audio device, an optical device or a video device.

Figure 7:
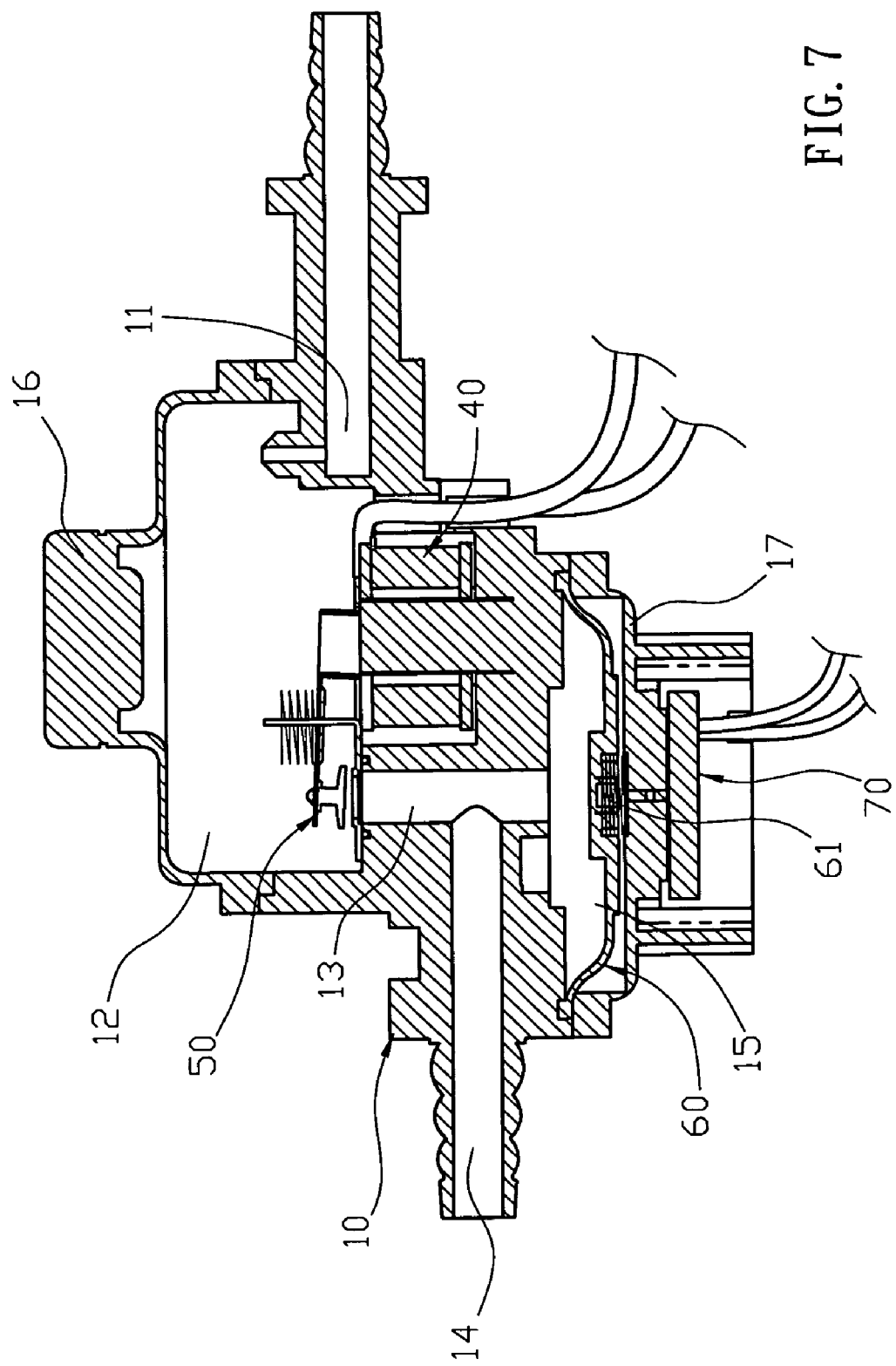
FIG. 7 is a plan cross-sectional view of a gas leak detection apparatus in accordance with another preferred embodiment of the present invention.

As shown in FIG. 7, the control lever 20 and the pressure regulating device 30 are undefined, and the gas leak detection apparatus can stabilize the gas pressure in the gas pipe.

Accordingly, if the pressure detector 70 detects that the level of the control point 61 of the pressure sensing device 60 is changed during a preset period of time, which indicates that the gas leak happens to the pipe located at the rear side of the gas regulator, the pressure detector 70 transmits the gas pressure signal from the pressure sensing device 60 to the control circuit board 80 which drives the magnetically exciting device 40 to produce a magnetic force to drive the reed switch magnetically operated valve 50 to close the conduit 13 of the valve chamber 12 and the outlet 14 of the main body 10 so as to interrupt the gas flow, thereby preventing the gas from entering the pipe located at the rear side of the gas regulator so as to provide a safety effect to the user. In addition, when the gas leak detection apparatus detects an abnormal condition, such as falling of the gas line, instability of the gas pressure, the magnetically exciting device 40 is operated to drive the magnetically operated valve 50 to close the conduit 13 of the valve chamber 12 and the outlet 14 of the main body 10 so as to interrupt the gas flow. Further, the control circuit board 80 indicates the inner conditions of the main body 10 synchronously by an audio device, an optical device or a video device. Further, the gas leak detection apparatus is available for a gas regulator that is in use and not in use, thereby enhancing the versatility of the gas leak detection apparatus, and thereby facilitating the user operating the gas leak detection apparatus.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A gas leak detection apparatus, comprising:

a main body having a first side provided with an inlet and a second side provided with an outlet and having an inside formed with a detection chamber and a valve chamber which has a first side connected to the inlet and a second side provided with a conduit connected to the outlet and the detection chamber;

a magnetically operated valve mounted in the valve chamber of the main body to close or open the conduit of the valve chamber;

a magnetically exciting device mounted in the valve chamber of the main body to control operation of the magnetically operated valve;

a pressure sensing device mounted in the detection chamber of the main body to sense a gas pressure contained in the conduit of the valve chamber to obtain a gas pressure signal;

a pressure detector mounted in the detection chamber of the main body to receive the gas pressure signal from the pressure sensing device to control operation of the magnetically exciting device;

the magnetically operated valve is operated to close the conduit of the valve chamber at a normal state so as to close the outlet of the main body at a normal state;

the conduit is connected between the valve chamber, the outlet and the detection chamber;

the pressure sensing device is movable upward and downward in the detection chamber of the main body by a gas pressure contained in the conduit of the valve chamber;

the pressure sensing device has a bottom provided with a control point that is movable with the pressure sensing device, so that the control point has a level that is changed by movement of the pressure sensing device;

the pressure detector detects the level of the control point of the pressure sensing device so as to detect the gas pressure contained in the conduit of the valve chamber.

2. The gas leak detection apparatus in accordance with claim 1, wherein the magnetically exciting device is located beside the conduit of the valve chamber and flush with a bottom wall of the valve chamber.

3. The gas leak detection apparatus in accordance with claim 1, wherein the magnetically exciting device is connected to and controlled by a control circuit board to produce a magnetic force to drive the magnetically operated valve to close or open the conduit of the valve chamber so as to close or open the outlet of the main body.

4. The gas leak detection apparatus in accordance with claim 1, wherein the magnetically operated valve is located above the magnetically exciting device and the conduit of the valve chamber;

the conduit of the valve chamber, the outlet and the detection chamber are closed when the magnetically operated valve is operated to close the conduit of the valve chamber.

5. The gas leak detection apparatus in accordance with claim 1, wherein the magnetically operated valve aligns with the conduit of the valve chamber;

the conduit of the valve chamber is located between the magnetically operated valve and the pressure sensing device;

the pressure sensing device is located between the conduit of the valve chamber and the pressure detector;

the conduit of the valve chamber is in line with the magnetically operated valve and the pressure sensing device;

when the pressure detector detects a leak in the conduit of the valve chamber or the outlet, the pressure sensing device is pushed toward the conduit of the valve chamber and the magnetically operated valve, the control point of the pressure sensing device is movable outwardly relative to the pressure detector, and the conduit of the valve chamber is closed by the magnetically operated valve.

6. The gas leak detection apparatus in accordance with claim 3, wherein the pressure detector is connected to the control circuit board to transmit the gas pressure signal from the pressure sensing device to the control circuit board which drives the magnetically exciting device to produce a magnetic force to drive the magnetically operated valve to close the conduit of the valve chamber.

7. The gas leak detection apparatus in accordance with claim 3, wherein the control circuit board indicates inner conditions of the main body synchronously by an audio device, an optical device or a video device.

8. The gas leak detection apparatus in accordance with claim 1, wherein the valve chamber of the main body has an open top wall for mounting a seal cover.

9. The gas leak detection apparatus in accordance with claim 1, wherein the detection chamber of the main body has an open bottom wall for mounting a seal cap.

10. The gas leak detection apparatus in accordance with claim 9, wherein the pressure detector is mounted on an outside of the seal cap so that the seal cap is located between the pressure detector and the pressure sensing device.

11. The gas leak detection apparatus in accordance with claim 1, further comprising a control lever pivotally mounted in the valve chamber of the main body to adjust a size of the inlet of the main body, and a pressure regulating device movably mounted in the valve chamber of the main body to control movement of the control lever.

12. The gas leak detection apparatus in accordance with claim 11, wherein the pressure regulating device is movable upward and downward in the valve chamber of the main body by the gas pressure from the inlet of the main body into the valve chamber of the main body to move the control lever upward and downward to adjust the size of the inlet of the main body and to control the gas flow rate from the inlet of the main body into the valve chamber of the main body so as to keep the gas pressure in the valve chamber of the main body.

13. The gas leak detection apparatus in accordance with claim 1, wherein a gas from the valve chamber of the main body flows serially through the magnetically operated valve and the conduit of the valve chamber into the outlet of the main body and the detection chamber of the main body simultaneously.

* * * * *